No. 775,009. Patented November 15, 1904.

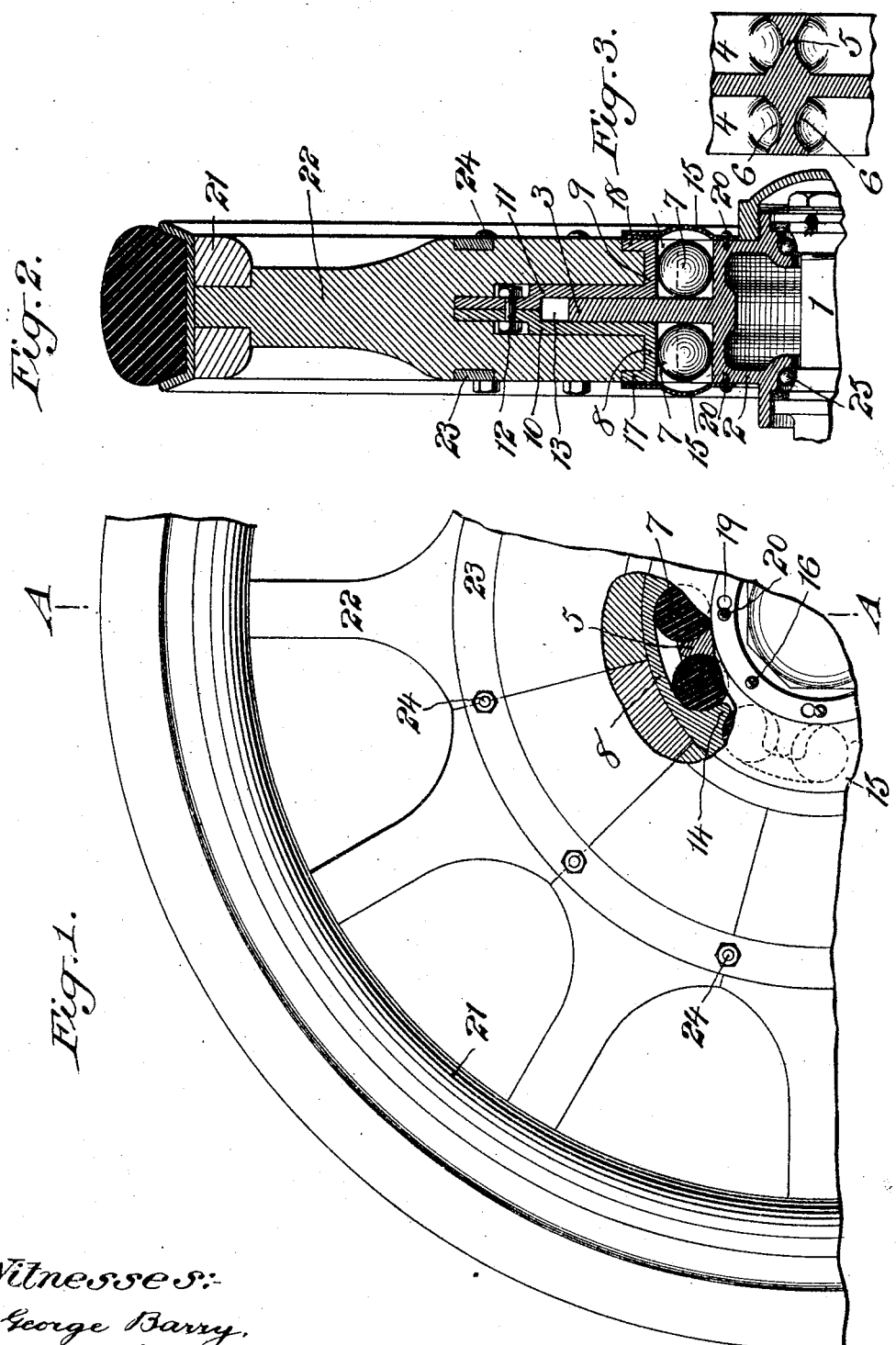

UNITED STATES PATENT OFFICE.

RALPH LANCASTER AND JOSEPH H. LANCASTER, OF EAST ORANGE, NEW JERSEY.

VEHICLE-WHEEL.

SPECIFICATION forming part of Letters Patent No. 775,009, dated November 15, 1904.

Application filed January 20, 1904. Serial No. 189,789. (No model.)

*To all whom it may concern:*

Be it known that we, RALPH LANCASTER and JOSEPH H. LANCASTER, citizens of the United States, and residents of East Orange, in the county of Essex and State of New Jersey, have invented a new and useful Improvement in Vehicle-Wheels, of which the following is a specification.

Our invention relates to an improvement in vehicle-wheels, and has more particularly for its object to provide a cushion-hub therefor which will be extremely strong and in which the liability of the cushions becoming disarranged or cut is obviated and in which the danger of the wheel buckling is eliminated.

A practical embodiment of our invention is represented in the accompanying drawings, in which—

Figure 1 represents a side view of a portion of a vehicle-wheel embodying our invention, a part of the same being broken away and shown in section to more clearly illustrate the cushions and their position between the overlapping lugs of the inner and outer hubs. Fig. 2 is a transverse section taken in the plane of the line A A of Fig. 1, and Fig. 3 is a detail sectional view through a small portion of the inner hub for illustrating the shallow recesses for the cushions in the lugs which project outwardly from the periphery of the hub.

The axle is denoted by 1, and the inner hub, which is mounted thereon, is denoted by 2. A circumferential flange 3 extends outwardly from the periphery 4 of the inner hub 2 about midway between its ends. The inner hub 2 is further provided with an annular series of transverse lugs 5 on its periphery upon each side of the flange 3. Each of these lugs 5 is provided in its opposite faces with shallow recesses 6 for receiving therein portions of the elastic balls or cushions 7, which bear against the lug, these shallow recesses serving to retain the elastic balls or cushions in position against lateral displacement.

The outer hub comprises two ring members 8 9, spaced from the periphery of the inner hub 2, which ring members are provided with circumferential flanges 10 11, secured together by suitable fastening-bolts 12, within which flanges is formed an annular groove 13 for receiving the circumferential flange 3 of the inner hub, the periphery of the flange being normally spaced a short distance from the bottom of the groove. In the present instance we have shown this flange 3 as having an extended bearing with the side walls of the groove 13 in the outer hub, so as to prevent the buckling of the wheel under side strains. The inner walls of the ring portions 8 9 of the outer hub are provided with an annular series of inwardly-extended lugs 14 upon each side of the flange 3, which lugs 14 are arranged alternately with respect to the lugs 5 on the inner hub.

The balls or cushions 7 are interposed between consecutive lugs on the inner and outer hubs, and the said lugs overlap each other sufficiently to permit a direct thrust upon the balls or cushions at their greatest diameter, thus getting the full cushioning effect of the balls or cushions, and also obviate the danger of tearing them when a rotary movement is imparted either to the inner or outer hub, as the case may be. This construction insures a thorough cushioning of the wheel, both in a vertical direction and in a rotary direction.

Dust-guards may be provided for inclosing the outer ends of the annular spaces formed between the inner and outer hubs, which dust-guards in the present instance comprise rings 15, secured by screws 16 to the inner hub and permitting a sliding frictional engagement with the end flanges 17 18 of the outer hub. Each of these dust-guards is made readily removable by providing the ring 15 with a series of elongated slots 19, through which pass screws 20, secured to the end of the inner hub, the connection being such that when the single screw 16 is removed the ring may be released by imparting to the ring a short rotary movement sufficient to bring the heads of the screws 20 opposite the enlarged portions of the elongated slots 19.

In the present instance we have shown the outer hub as connected to the rim 21 of the wheel by a series of heavy spokes 22, the inner ends of the spokes being engaged with the periphery of the ring-sections 8 and 9 of the outer hub and embracing the flanges 10 and 11. The wheel may be further strengthened by rings 23, located upon both sides of the wheel, and preferably countersunk into the same, which rings are clamped into position by tie-bolts 24. These tie-bolts 24 also pass through the outer ends of the flanges 10 11 of the outer hub for still further strengthening the wheel and securing the spokes in position upon the outer hub.

The lugs 5, which project outwardly from the periphery of the inner hub, are preferably cast integral with the circumferential flange 3 as well as the periphery of the hub, and the lugs 14, which project inwardly from the outer hub, preferably bear against the faces of the flange 3 between the lugs 5, thus increasing the extended bearing between the flange 3 and the outer hub, and thereby strengthen the wheel to prevent breakage under lateral strains.

While we have shown the inner hub in the accompanying drawings as having a ball-bearing engagement 25 with the axle 1, it is to be understood that the inner hub may be fixed to the axle where the axle forms a driving part. It is also to be understood that other changes might be resorted to in the construction, form, and arrangement of the several parts without departing from the spirit and scope of our invention. Hence we do not wish to limit ourselves strictly to the structure herein shown and described; but

What we claim is—

1. A vehicle-wheel comprising inner and outer hubs provided with lugs, the lugs on one hub overlapping and alternately arranged with respect to the lugs on the other hub, and a separate elastic cushion or ball inserted between each two consecutive overlapping lugs.

2. A vehicle-wheel comprising inner and outer hubs, the one being provided with an annular groove and the other fitted with a flange to enter the said groove and lugs projecting from the inner and outer hubs upon opposite sides of the flange, the lugs on one hub alternating with the lugs on the other hub, the inner sides of the lugs on the hub bearing the flange merging into the flange and the inner sides of the lugs on the other hub snugly engaging the flange for strengthening the connection between the inner and outer hubs, and separate elastic cushions or balls inserted between consecutive lugs.

3. A vehicle-wheel comprising inner and outer hubs, the one being provided with an annular groove and the other with a flange fitted to enter said groove, and lugs on the inner and outer hubs upon the opposite sides of the flange, the lugs on one hub overlapping and alternately arranged with the lugs on the other hub, the inner sides of the lugs on the hub bearing the flange merging into the flange and the inner sides of the lugs carried by the other hub snugly engaging the flange for strengthening the connection between the two hubs and separate elastic cushions or balls inserted between consecutive overlapping lugs.

4. A vehicle-wheel comprising an inner hub, lugs projecting outwardly therefrom, an outer hub, lugs projecting inwardly therefrom alternating with the lugs on the inner hub, elastic cushions or balls inserted between the consecutive lugs of the inner and outer hubs and seats formed in the lugs for retaining the elastic cushions or balls in position against lateral displacement.

In testimony that we claim the foregoing as our invention we have signed our names, in presence of two witnesses, this 17th day of December, 1903.

RALPH LANCASTER.
JOSEPH H. LANCASTER.

Witnesses:
 FREDK. HAYNES,
 HENRY THIEME.